United States Patent
Matsumoto et al.

(10) Patent No.: US 6,274,109 B1
(45) Date of Patent: Aug. 14, 2001

(54) CONVERSION PROCESS FOR CARBONYL SULFIDE AND/OR HYDROGEN CYANIDE CONTAINED IN MIXED GAS

(75) Inventors: Hideyuki Matsumoto, Kanagawa; Shinya Ishigaki, Aichi; Eiichi Hosoya, Tokyo, all of (JP)

(73) Assignees: JGC Corporation; Sued-Chemie Nissan Catalysts, Inc., both of Tokyo (JP)

( * ) Notice: Subject to any disclaimer, the term of this patent is extended or adjusted under 35 U.S.C. 154(b) by 0 days.

(21) Appl. No.: 09/486,825

(22) PCT Filed: Jun. 30, 1999

(86) PCT No.: PCT/JP99/03535
§ 371 Date: Jun. 16, 2000
§ 102(e) Date: Jun. 16, 2000

(87) PCT Pub. No.: WO00/01788
PCT Pub. Date: Jan. 13, 2000

(30) Foreign Application Priority Data

Jul. 6, 1998 (JP) .................................. 10-205822

(51) Int. Cl.$^7$ .............................. C01C 3/04; C01B 17/04; C01B 17/16; B01J 23/26
(52) U.S. Cl. .................... 423/236; 423/244.02; 423/564; 502/320; 502/355
(58) Field of Search .............................. 423/236, 244.01, 423/244.02, 564; 502/320, 355

(56) References Cited

U.S. PATENT DOCUMENTS 4,668,491 * 5/1987 Wimmer ............................. 423/244
5,660,807 * 8/1997 Forg ..................................... 423/236

FOREIGN PATENT DOCUMENTS 0 171 001 2/1986 (EP) .
0 380 184 8/1990 (EP) .

* cited by examiner

Primary Examiner—Steven P. Griffin
Assistant Examiner—Maribel Medina
(74) Attorney, Agent, or Firm—McDermott, Will & Emery

(57) ABSTRACT

Carbonyl sulfide and/or hydrogen cyanide contained in a mixed gas are/is converted by contacting the mixed gas with an alkalized chromium oxide-aluminum oxide catalyst in the presence of steam, wherein the mixed gas and the steam at a volume ratio of $0.05 \leq$ steam/mixed gas $\leq 0.3$ are contacted with the alkalized chromium oxide-aluminum oxide catalyst at a gas hourly space velocity no less than 2000 $h^{-1}$ at a temperature in the range of 150° C. through 250° C. In this case, the alkalized chromium oxide-aluminum oxide catalyst is set to have a grain size in the range of 1 mm through 4.5 mm. With this arrangement, since the surface area of a catalyst can be increased to a certain degree, the activity of the catalyst is increased to achieve the high processing speed, while since generation of a side reaction can be suppressed, lowering of the conversion rate of COS and/or HCN caused by the side reaction can be suppressed.

5 Claims, 6 Drawing Sheets

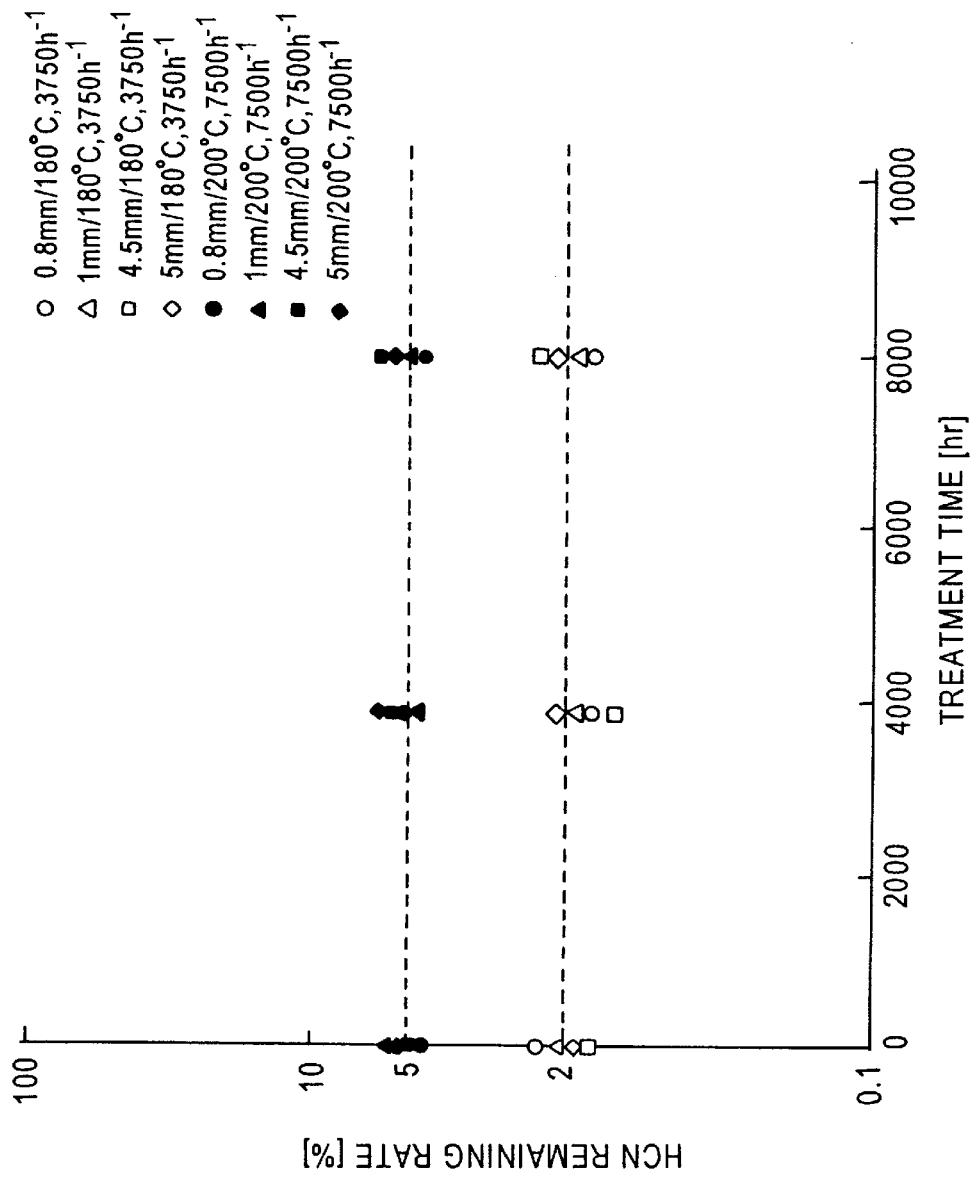

CONVERSION PROCESS FOR CARBONYL SULFIDE AND/OR HYDROGEN CYANIDE CONTAINED IN MIXED GAS

TECHNICAL FIELD

The present invention relates to a process for converting carbonyl sulfide (COS) into $CO_2$ and $H_2S$ and/or hydrogen cyanide (HCN) into $NH_3$ and CO or $CH_4$ by contacting a mixed gas, containing COS and/or HCN, obtained by, for example, partial oxidation of heavy oil or coal, with an alkalized chromium oxide-aluminum oxide catalyst, so as to remove COS and/or HCN from the mixed gas.

BACKGROUND ART

Gas mainly composed of $H_2$ and CO, obtained by partial oxidation of heavy oil or coal contains impurities, such as hydrogen sulfide ($H_2S$), COS and HCN. As one of methods of removing $H_2S$ from the gas, a wet absorption method using methylenediethanolamine (MDEA) is known. However, since this method aims to remove $H_2S$ selectively, the rate of removal of COS is low. Further, in this method, HCN reacts with MDEA to form a stable compound so that MDEA is deteriorated. Therefore, it is necessary to carry out a conversion treatment for COS and HCN as a pretreatment.

The pretreatment is a treatment for converting COS into $H_2S$ which can be easily treated with MDEA, and HCN into $NH_3$ which does not adversely affect an MDEA solution treatment, through conversion reactions represented by chemical formulae (1), (2) and (3) given below.

$$COS+H_2O \rightarrow CO_2+H_2S \quad (1)$$

$$HCN+H_2O \rightarrow NH_3+CO \quad (2)$$

$$HCN+3H_2 \rightarrow NH_3+CH_4 \quad (3)$$

Alumina catalysts are normally used for the conversion of COS. For example, catalysts in the state of alkalized alumina carrying potassium hydroxide or its salt reported in JP 5-70500 B2 and JP 768528 B2 and a catalyst made from alumina and barium oxide reported in JP 5-4133 B2 are used as active alumina catalysts.

It has been experimentally confirmed, however, that although each of the foregoing alkalized alumina catalysts is excellent in COS converting activity, alumina thereof changes into boehmite even in the presence of steam of only about 0.3 atm so that the COS converting activity is significantly deteriorated. Further, those catalysts have substantially no or less HCN conversion activity. On the other hand, the foregoing catalyst made from alumina and barium oxide is excellent in COS converting activity at low temperatures and is prevented from changing into boehmite under steam. However, it has also been confirmed that its activity with respect to HCN conversion is very low.

Under these circumstances, there has been a demand for a catalyst whose COS conversion activity is prevented from deterioration under steam and whose HCN converting activity is also high. As such a catalyst, there is an alkalized chromium oxide-aluminum oxide catalyst as reported in JP 5-80257 B2.

However, the processing speed of the alkalized chromium oxide-aluminum oxide catalyst is low. Thus, when converting a large amount of mixed gas containing COS and HCN, the processing takes a long time. For shortening the processing time, a large amount of the catalyst is required thereby to increase the size of an apparatus and thus the cost thereof.

From the industrial viewpoint, it is required that upon converting the foregoing mixed gas by contacting it with a catalyst in the presence of the steam, the mixed gas and the steam at a volume ratio of $0.05 \leq$ steam/mixed gas $\leq 0.3$ be contacted with the catalyst at a gas hourly space velocity no less than 2000 $h^{-1}$ at a temperature in the range of 150° C. through 250° C. for a long time. Accordingly, it is required that the processing speed of the catalyst be high and the lowering of the catalyst activity be suppressed even during the long-time processing.

The grain size of the foregoing alkalized chromium oxide aluminum oxide catalyst is about 5 mm to 6 mm. In general, it is known that the activity of a catalyst increases as the geometrical surface area per unit weight of the catalyst increases. In this regard, the present inventors have aimed to obtain a catalyst suitable for mass-treating the mixed gas on an industrial scale by optimizing the size of the alkalized chromium oxide-aluminum oxide catalyst.

The present invention has been made under such circumstances and has an object to provide a conversion process for COS and/or HCN contained in a mixed gas, wherein upon implementing a conversion mass-treatment for COS and/or HCN contained in the mixed gas, COS and/or HCN can be converted at the high processing speed and further the high conversion rate of COS and/or HCN can be achieved even during the long-time processing.

DISCLOSURE OF THE INVENTION

For accomplishing the foregoing object, according to the present invention, there is provided a process for converting at least one of carbonyl sulfide and hydrogen cyanide contained in a mixed gas by contacting the mixed gas containing the foregoing carbonyl sulfide and/or hydrogen cyanide with an alkalized chromium oxide-aluminum oxide catalyst in the presence of steam, the process characterized in that the mixed gas and the steam at a volume ratio of $0.05 \leq$ steam/mixed gas $\leq 0.3$ are contacted with the alkalized chromium oxide-aluminum oxide catalyst having a grain size in the range of 1 mm through 4.5 mm at a gas hourly space velocity no less than 2000 $h^{-1}$ at a temperature in the range of 150° C. through 250° C.

It may be arranged that the alkalized chromium oxide-aluminum oxide catalyst contains 1 to 40 weight % of chromium oxide and 0.1 to 15 weight % of basic alkali metal compound calculated as oxide.

It may be arranged that the basic alkali metal compound is potassium carbonate.

BRIEF DESCRIPTION OF THE DRAWINGS

FIG. 6 is a characteristic diagram showing a relationship between HCN remaining rate and treatment time.

BEST MODE FOR CARRYING OUT THE INVENTION

Now, a preferred embodiment of the present invention will be described with reference to the accompanying drawings. In the preferred embodiment, impurities, such as COS, HCN and $H_2S$, contained in a mixed gas obtained by, for example, partial oxidation of heavy oil or coal are removed from the mixed gas, wherein a process of the present invention is applied to a converting treatment for COS and HCN as a pretreatment carried out prior to a wet absorption treatment for removing $H_2S$ from the mixed gas.

In the converting treatment, COS and HCN are converted by contacting the mixed gas containing COS and HCN with a catalyst in the presence of steam. It is required that upon carrying out the converting treatment on an industrial scale, the mixed gas and the steam at a volume ratio of $0.05 \leq$steam/mixed gas$\leq 0.3$ be contacted with the catalyst at a gas hourly space velocity no less than 2000 $h^{-1}$ a temperature in the range of 150° C. through 250° C. and this process be continued for 8000 hours or more. In view of this, the present invention aims to optimize the grain size of the catalyst for increasing the processing speed of the catalyst and suppressing the deterioration of the activity of the catalyst.

Figure 1:
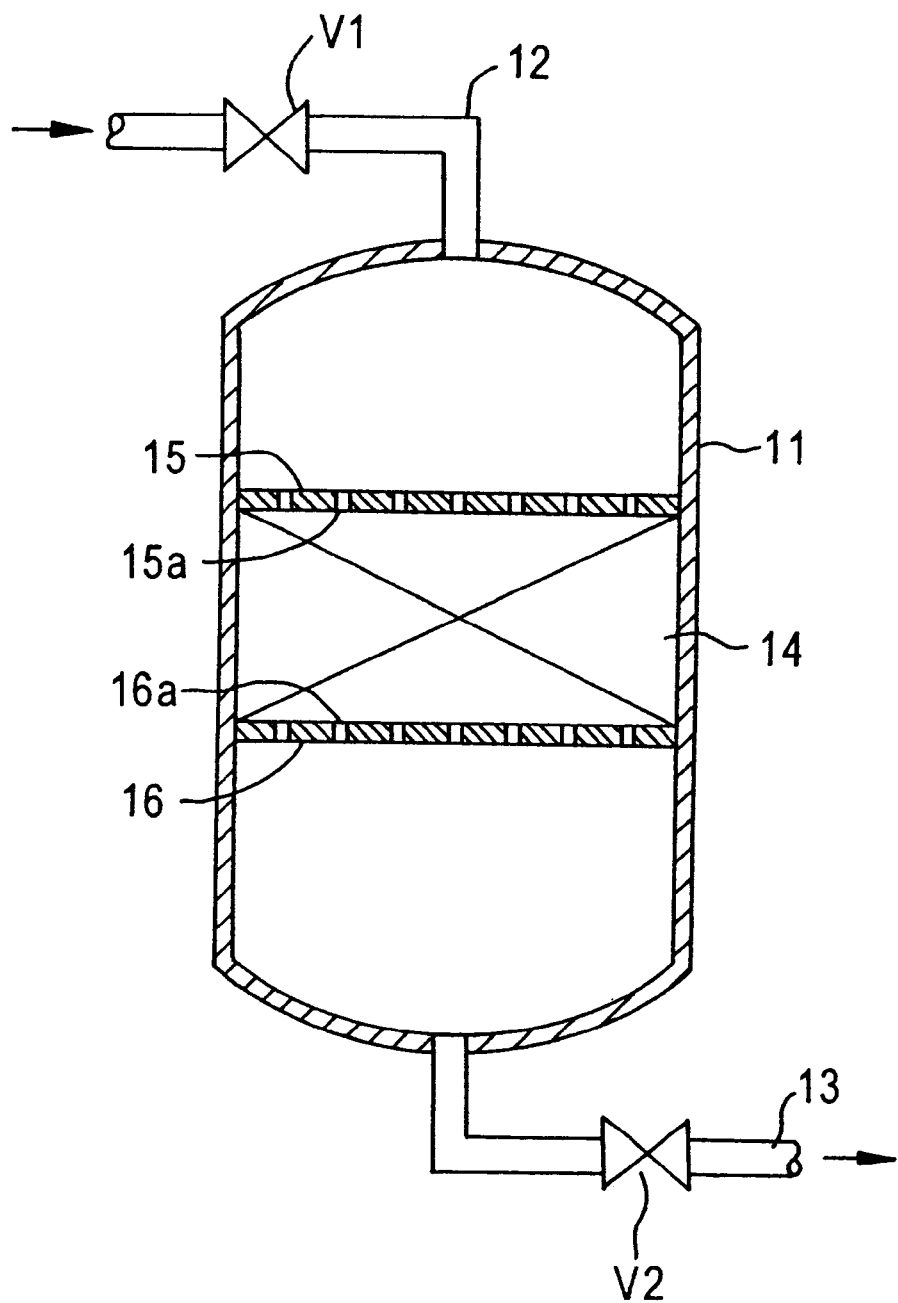
FIG. 1 is a sectional side view showing an example of a converting apparatus for implementing a process of the present invention.

First, an example of a converting apparatus to be used for implementing the process of the present invention will be described with reference to FIG. 1. In FIG. 1, numeral 11 denotes a reactor having a top portion and a bottom portion to which a gas feed conduit 12 with a valve V1 and a gas discharge conduit 13 with a valve V2 are connected, respectively. In the reactor 11 is disposed a catalyst bed 14 filled with a catalyst. The catalyst bed 14 is supported by catalyst supports 15 and 16 at upper and lower sides thereof, respectively. The catalyst supports 15 and 16 are formed with a number of gas flow holes 15a and 16a, respectively. Each of the gas flow holes 15a and 16a is of a size which is large enough to allow the flow of the mixed gas therethrough and small enough to inhibit the catalyst to pass therethrough.

Now, the catalyst will be explained. The catalyst used in the present invention is an alkalized chromium oxide-aluminum oxide catalyst. This catalyst contains about 1 to 40 weight %, preferably about 3 to 20 weight % of chromium oxide ($Cr_2O_3$), and about 0.1 to 15 weight %, preferably about 1 to 10 weight % of basic alkali metal compound (calculated as oxide). As a substance carrying the catalytic component, aluminum oxide ($Al_2O_3$) such as γ-aluminum oxide having a surface area of, for example, 30 to 300 $m^2/g$, preferably 60 to 220 $m^2/g$ is used. As the foregoing basic alkali metal compound, potassium carbonate ($K_2CO_3$) is suitably used, but hydroxide, carbonate, bicarbonate, acetate, oxalate or the like of sodium (Na), potassium (K), rubidium (Rb), cesium (Cs) or the like may also be used therefor.

The alkalized chromium oxide-aluminum oxide catalyst is produced in the following manner. Specifically, for example, an aluminum oxide carrier is dipped into a chromate solution at a temperature in the range of 20° C. through 120° C., then dried stepwise at a temperature in the range of 80° C. through 800° C. and then calcined. Subsequently, chromium oxide-aluminum oxide thus obtained is dipped into a potassium carbonate solution, then again dried at a temperature in the range of 80° C. through 180° C. to make it alkalized so that the alkalized chromium oxide-aluminum oxide catalyst is obtained. In the present invention, the process of dipping the chromium oxide-aluminum oxide into the aqueous solution of the alkaline alkali metal compound and drying it is called alkalization and the thus obtained catalyst is called the alkalized chromium oxide-aluminum oxide catalyst.

In the foregoing manner, the alkalized chromium oxide-aluminum oxide catalyst containing 8 to 12 weight % of $Cr_2O_3$, about 4 weight % of $K_2CO_3$ and the residual of γ-$Al_2O_3$ and having a surface area of about 150 $m^2/g$ is obtained. Then, the obtained catalyst is formed into cylindrical tablets or extrusion-molded, each having a diameter in the range of 1 mm through 4.5 mm and a height in the range of 1 mm through 4.5 mm. As such an alkalized chromium oxide aluminum oxide catalyst, G41-P (trade name: produced by Girdler Corporation) can be used.

The present invention is characterized in that the grain size of the alkalized chromium oxide-aluminum oxide catalyst is set to be no less than 1 mm and no greater than 4.5 mm. The catalyst is not limited to the shape of the cylindrical tablet, but may have a spherical shape, a Raschig ring shape, a honeycomb shape or the like, or may be extrusion-molded. Setting the grain size of the catalyst to be no less than 1 mm and no greater than 4.5 mm means that when the catalyst is formed into a spherical shape a diameter thereof is set to be no less than 1 mm and no greater than 4.5 mm, and that when the catalyst is formed into another shape an equivalent diameter (a length 6 times a ratio between geometrical volume and surface area) thereof is set to be no less than 1 mm and no greater than 4.5 mm.

Now, the process of the present invention implemented using the foregoing converting apparatus will be described. First, while opening the valves V1 and V2, the mixed gas and the steam at a volume ratio of $0.05 \leq$steam/mixed gas$\leq 0.3$ heated beforehand to a temperature in the range of 150° C. through 250° C. are introduced into the reactor 11 under the pressure in the range of 20 kg/$cm^2$G through 80 kg/$cm^2$G. In the reactor 11, the mixed gas and the steam flow into the catalyst bed 14 via the gas flow holes 15a of the catalyst support 15 so as to contact with the catalyst at a gas hourly space velocity no less than 2000 $h^{-1}$ at a temperature in the range of 150° C. through 250° C. At this time, the conversion of COS and HCN represented by the foregoing chemical formulae (1), (2) and (3) is carried out so that COS is converted into $CO_2$ and $H_2S$, and HCN is converted into $NH_3$ and CO or $CH_4$.

The conversion is carried out in the foregoing manner so that the mixed gas from which COS and HCN have been removed due to the conversion thereof is discharged to the exterior of the reactor 11 via the gas discharge conduit 13. Thereafter, the mixed gas is subjected to the subsequent wet absorption treatment so that $H_2S$ is removed from the mixed gas using, for example, MDEA aqueous solution.

Now, how the optimum grain size of the alkalized chromium oxide-aluminum oxide catalyst was found out will be explained using the results of experiments. In consideration that the activity of the catalyst increases as the geometrical surface area per unit weight of catalyst in the catalyst bed 14 increases, the present inventors first aim to confirm how the grain size of the catalyst influences COS converting reactivity.

Specifically, using an experimental converting apparatus similar to the apparatus shown in FIG. 1, a mixed gas (hydrogen gas) containing COS at a rate of 400 ppmv and steam were introduced into a reactor 11 at a volume ratio of steam/mixed gas=1/6.5. In the reactor 1, the mixed gas and steam were contacted with the alkalized chromium oxide-aluminum oxide catalyst at 180° C. under 27 kg/$cm^2$G so as to examine a relationship between the catalyst-mixed gas contact time (reaction time) and the COS remaining rate (COS non-conversion rate). The experiment was carried out by changing the grain size of the catalyst.

Figure 2:
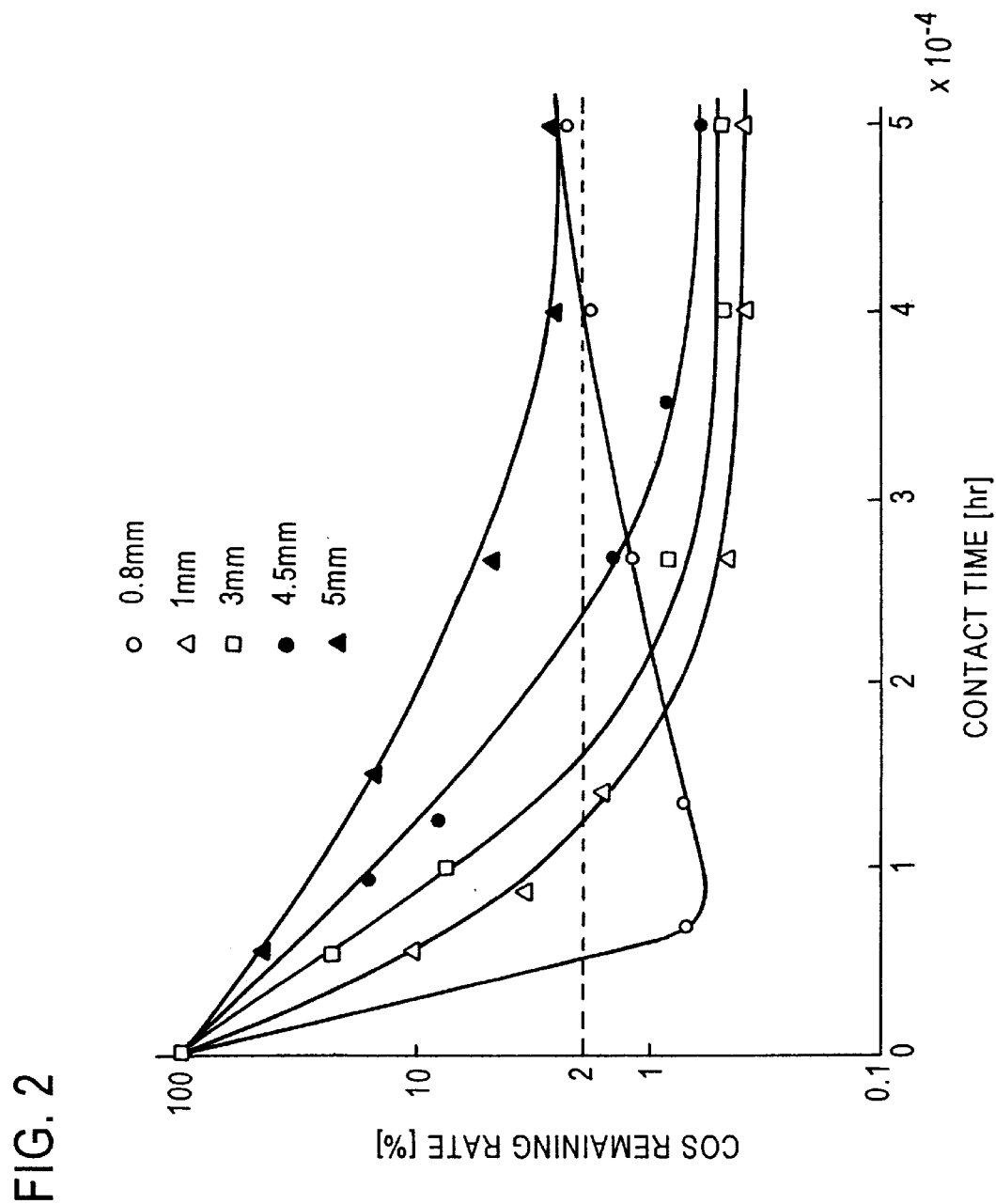
FIG. 2 is a characteristic diagram showing a relationship between COS remaining rate and catalyst-mixed gas contact time.

The results are shown in FIG. 2, wherein the abscissa represents the time of contact between the catalyst and the mixed gas, while the ordinate represents the COS remaining rate. The contact time represents a value calculated by 1/gas hourly space velocity [$h^{-1}$]. Further, in FIG. 2, O (white) represents a catalyst having the mean grain size of 0.8 mm (hereinafter referred to as "catalyst of grain size 0.8 mm"), Δ (white) represents a cylindrical catalyst having a diameter of 1 mm and a height of 1 mm (hereinafter referred to as "catalyst of grain size 1 mm"), square (white) represents a cylindrical catalyst having a diameter of 3 mm and a height of 3 mm (hereinafter referred to as "catalyst of grain size 3 mm"), O (black) represents a cylindrical catalyst having a diameter of 4.5 mm and a height of 4.5 mm (hereinafter referred to as "catalyst of grain size 4.5 mm"), and Δ (black) represents a cylindrical catalyst having a diameter of 5 mm and a height of 5 mm (hereinafter referred to as "catalyst of grain size 5 mm").

From the results of the experiment, it was confirmed that the COS conversion rate depended on the grain size of the catalyst, i.e. the COS conversion rate increased as the grain size of the catalyst decreased up to the grain size of 1 mm. This is considered to be caused by the fact that decrease of the grain size of the catalyst results in increase of the geometrical surface area per unit weight of the catalyst. It was also confirmed that the COS conversion rate increased with the grain size of 1 mm or more as the contact time increased. This is considered to be caused by the fact that the converting reaction advances as the contact time increases.

Further, when a target value of the COS conversion rate was set to 98% (a target value of the COS remaining rate was set to 2%), it was confirmed that the COS conversion rate of 98% could not be achieved with the catalyst of grain size 5 mm even when the contact time exceeded $5\times10^{-4}$ hours, namely the gas hourly space velocity lowered to 2000 $h^{-1}$. Accordingly, it was confirmed that when the COS conversion rate was set to no less than 98% and the gas hourly space velocity was set to no less than 2000 $h^{-1}$, the grain size of the catalyst was preferably set to no greater than 4.5 mm.

On the other hand, in case of the catalyst of grain size 0.8 mm, it was confirmed that although the COS conversion rate once rapidly increased (the COS remaining rate once rapidly decreased), the COS remaining rate gradually increased with increase of the contact time and exceeded 2% when the contact time reached $5\times10^{-4}$ hours. Accordingly, it was confirmed that when the COS conversion rate was set to no less than 98% and the gas hourly space velocity was set to no less than 2000 $h^{-1}$, the grain size of the catalyst was preferably set to no less than 1 mm. This is considered to be caused by the fact that when the contact time increases with the catalyst of grain size less than 1 mm, a side reaction as represented by a chemical formula (4) given below is generated.

$$CO + H_2S \rightarrow COS + H_2 \quad (4)$$

Subsequently, a time-dependent variation of the COS converting reactivity was examined to confirm the lowering of the catalyst activity when the treatment was continued for 8000 hours. Specifically, using an experimental converting apparatus similar to the apparatus shown in FIG. 1, a mixed gas (hydrogen gas) containing COS at a rate of 400 ppmv and steam were introduced into a reactor 11 at a volume ratio of steam/mixed gas=⅛. In the reactor 11, the mixed gas and steam were contacted with the alkalized chromium oxide-aluminum oxide catalyst at 220° C. under 27 kg/cm²G so as to examine a relationship between the catalyst-mixed gas contact time and the COS remaining rate. The experiment was carried out by changing the grain size of the new catalyst and the grain size of the catalyst which had been continuously used for the treatment for 8000 hours.

Figure 3:
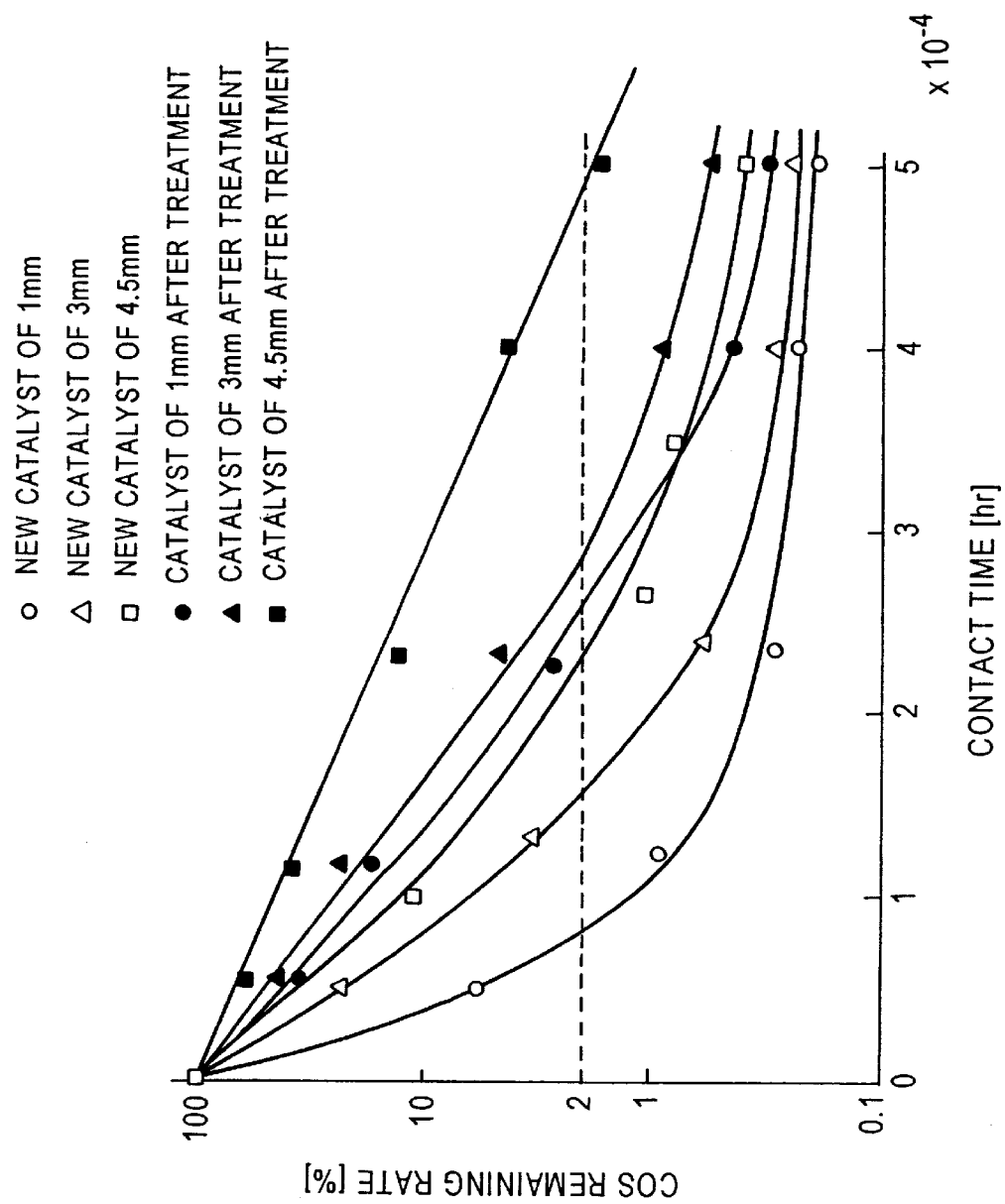
FIG. 3 is a characteristic diagram showing a relationship between COS remaining rate and catalyst-mixed gas contact time.

The results are shown in FIG. 3, wherein the abscissa represents the time of contact between the catalyst and the mixed gas, while the ordinate represents the COS remaining rate. In FIG. 3, O (white) represents a new catalyst having a grain size of 1 mm, Δ (white) represents a new catalyst having a grain size of 3 mm, square (white) represents a new catalyst having a grain size of 4.5 mm, O (black) represents a catalyst having a grain size of 1 mm after the treatment for 8000 hours, Δ (black) represents a catalyst having a grain size of 3 mm after the treatment for 8000 hours, and square (black) represents a catalyst having a grain size of 4.5 mm after the treatment for 8000 hours.

From the results of the experiment, it was confirmed that the catalyst after the treatment for 8000 hours was smaller in COS conversion rate as compared with the new catalyst and thus the activity of the catalyst was lowered after the long-time treatment. This is considered to be caused by the fact that since the conversion is a reaction with the steam, $Al_2O_3$, an active component of the catalyst, is changed into boehmite due to the reaction with steam so as to be inactive, thereby resulting in lowering of the activity of the catalyst.

It was also confirmed that both the new catalyst and the catalyst after the treatment for 8000 hours increased in COS conversion rate as the grain sizes thereof decreased. It was further confirmed that even in case of the catalyst after the treatment for 8000 hours, if the grain size was no greater than 4.5 mm, the COS conversion rate of 98% could be achieved when the contact time reached $5\times10^{-4}$ hours, i.e. when the gas hourly space velocity was 2000 $h^{-1}$, and moreover, if the grain size was 3 mm, the COS conversion rate of 98% could be achieved when the gas hourly space velocity was 3500 $h^{-1}$. Accordingly, it was confirmed that even if the treatment was continued for 8000 hours with the gas hourly space velocity set to no less than 2000 $h^{-1}$, the lowering of the catalyst activity could be suppressed to achieve the high catalyst activity of the 98% COS conversion rate by setting the grain size of the catalyst in the range of 1 mm through 4.5 mm.

Subsequently, a relationship between the boehmite changing rate of alumina of the catalyst in the COS converting treatment and the treatment time was confirmed in the following manner. Specifically, using an experimental converting apparatus similar to the apparatus shown in FIG. 1, a mixed gas (hydrogen gas) containing COS at a rate of 400 ppmv and steam were introduced into a reactor 11 at a volume ratio of steam/mixed gas=⅙.5 with gas hourly space velocity of 1000 $h^{-1}$. In the reactor 11, the mixed gas and steam were contacted with the alkalized chromium oxide-aluminum oxide catalyst at 220° C. under 27 kg/cm²G so as to examine a relationship between the relative boehmite changing rate and the treatment time. The grain size of the catalyst was set to 4.5 mm, and the relative boehmite changing rate was examined as a relative value by setting a boehmite peak area on an X-ray diffraction chart of the catalyst which had been continuously used for 8000 hours to be 100.

Figure 4:
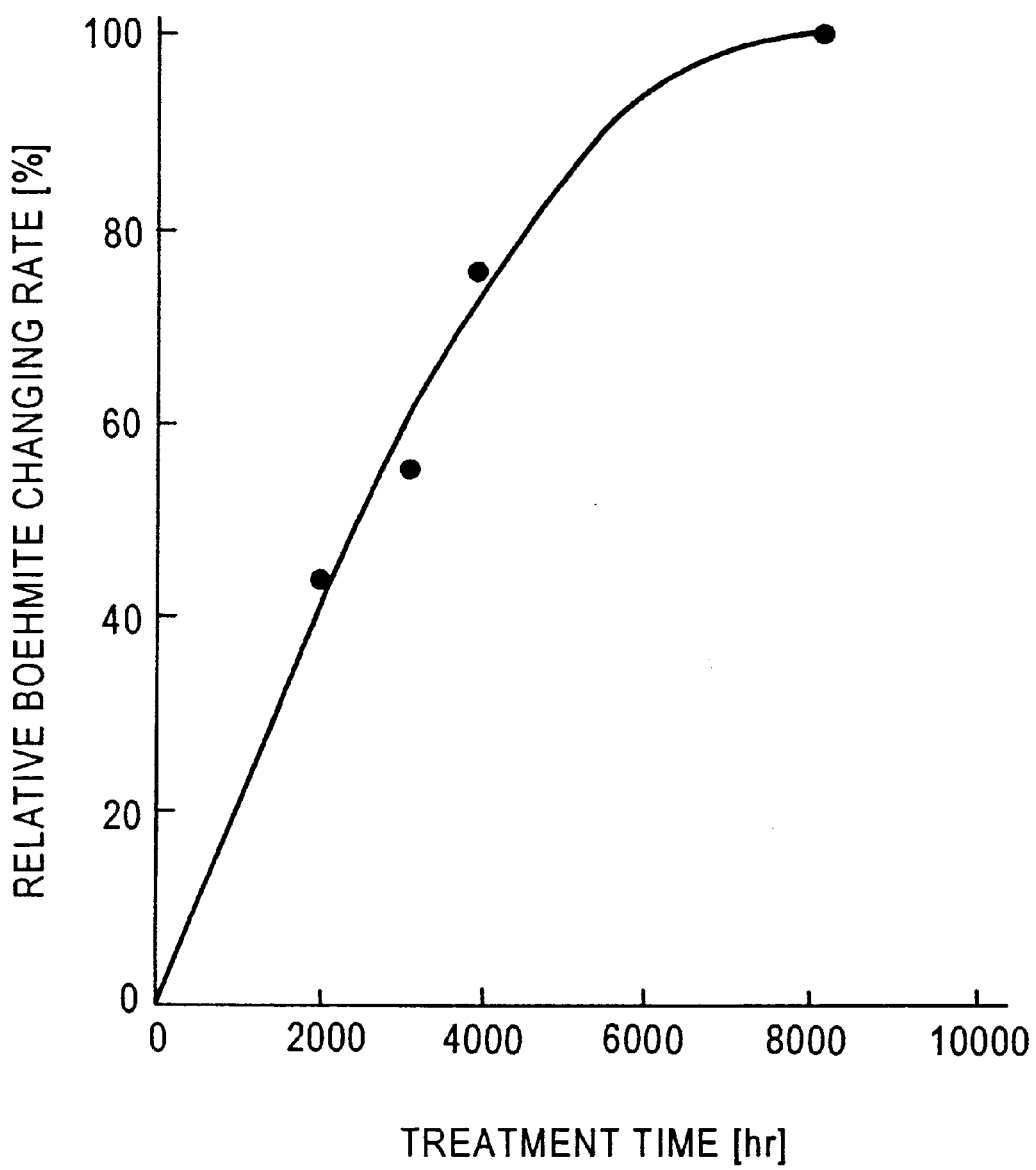
FIG. 4 is a characteristic diagram showing a relationship between relative boehmite changing rate and treatment time.

The results are shown in FIG. 4, wherein the abscissa represents the treatment time, while the ordinate represents the relative boehmite changing rate. From the results, it was confirmed that the boehmite changing rate of the catalyst increased as the treatment time increased, and it was thus understood that the lowering of the activity of the catalyst as the treatment time increased was caused by the progress of the alumina changing into boehmite.

Further, a relationship between the treatment time and the gas hourly space velocity for achieving the 98% COS conversion rate in the COS converting treatment was confirmed in the following manner. Specifically, using an experimental converting apparatus similar to the apparatus shown in FIG. 1, a mixed gas (hydrogen gas) containing COS at a rate of 400 ppmv and steam were introduced into a reactor 11 at a volume ratio of steam/mixed gas=⅛. In the reactor 11, the mixed gas and steam were contacted with the alkalized chromium oxidealuminum oxide catalyst at 220° C. under 27 kg/cm$^2$G so as to examine the gas hourly space velocity per treatment time which achieved the 98% COS conversion rate. The experiment was carried out by changing the grain size of the catalyst.

Figure 5:
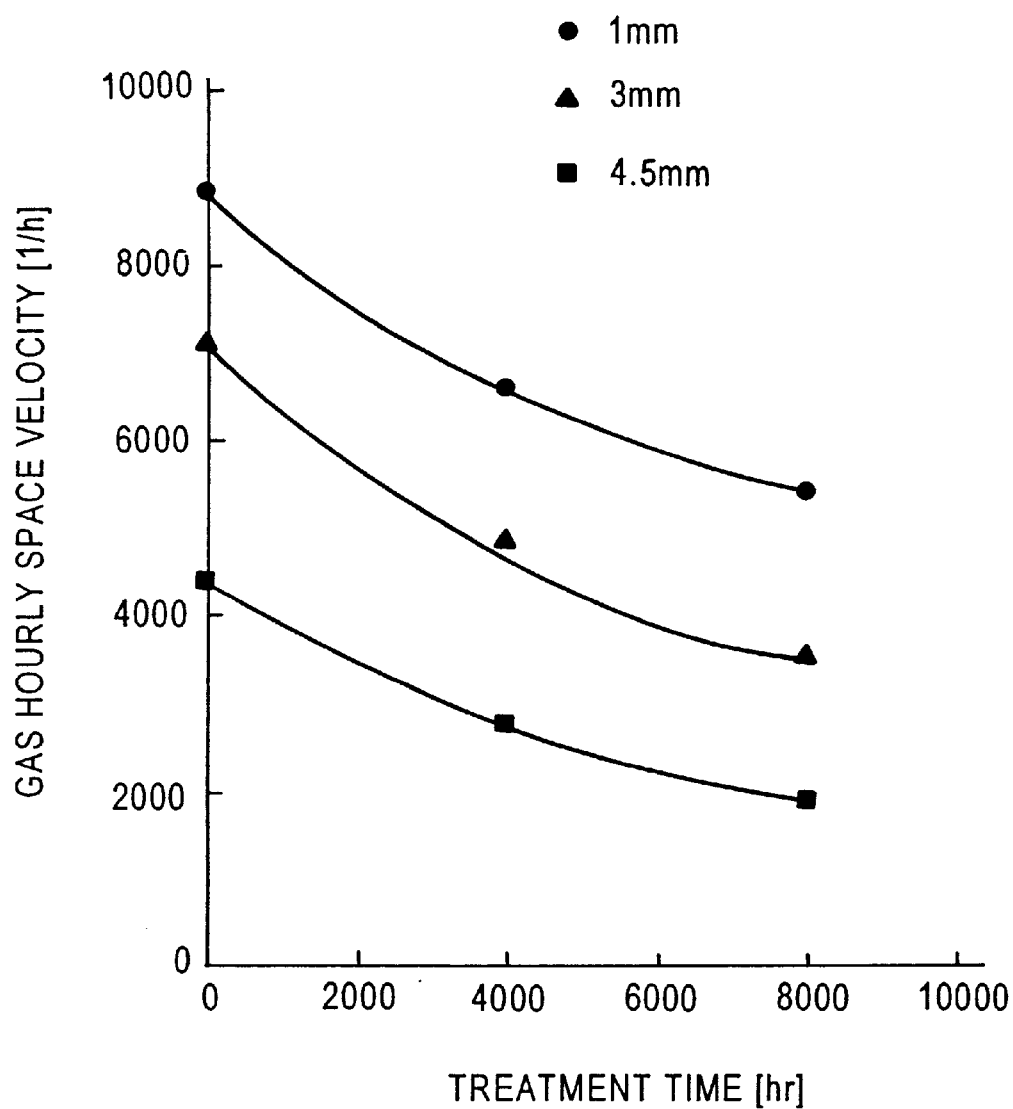
FIG. 5 is a characteristic diagram showing a relationship between gas hourly space velocity and treatment time.

The results are shown in FIG. 5, wherein the abscissa represents the treatment time, while the ordinate represents the gas hourly space velocity for achieving the 98% COS conversion rate. In FIG. 5, O (black) represents a catalyst having a grain size of 1 mm, Δ (black) represents a catalyst having a grain size of 3 mm, and square (black) represents a catalyst having a grain size of 4.5 mm. From the results, it was confirmed that the gas hourly space velocity for achieving the 98% COS conversion rate decreased as the treatment time increased, and it was further confirmed that the gas hourly space velocity for achieving the 98% COS conversion rate decreased even with the same treatment time as the grain size of the catalyst increased. Also from this experiment, it was confirmed that the activity of the catalyst was lowered as the treatment time increased and that the activity of the catalyst was improved as the grain size of the catalyst decreased. Further, also from this experiment, it was confirmed that when continuing the treatment for 8000 hours using the catalyst having the grain size of 4.5 mm, the gas hourly space velocity should be set to 2000 h$^{-1}$ for achieving the 98% COS conversion rate.

Subsequently, the following experiment was carried out for confirming how the grain size of the catalyst influences HCN converting reactivity. Specifically, using an experimental converting apparatus similar to the apparatus shown in FIG. 1, a mixed gas (hydrogen gas) containing HCN at a rate of 180 ppmv and steam were introduced into a reactor 11 at a volume ratio of steam/mixed gas=⅙.₅. In the reactor 11, the mixed gas and steam were contacted with the alkalized chromium oxide-aluminum oxide catalyst at the gas hourly space velocity of 3750 h$^{-1}$ at 180° C. under 27 kg/cm$^2$G so as to examine a relationship between the HCN remaining rate (HCN non-conversion rate) and the treatment time. The experiment was carried out by changing the grain size of the catalyst. Further, a similar experiment was carried out by changing the reaction temperature to 200° C. and the gas hourly space velocity to 7500 h$^{-1}$.

The results are shown in FIG. 6, wherein the abscissa represents the treatment time, while the ordinate represents the HCN remaining rate. In FIG. 6, O (white) represents a case wherein the grain size of a catalyst was set to 0.8 mm, the reaction temperature was set to 180° C. and the gas hourly space velocity was set to 3750 h$^{-1}$, Δ (white) represents a case wherein the grain size of a catalyst was set to 1 mm, the reaction temperature was set to 180° C. and the gas hourly space velocity was set to 3750 h$^{-1}$, square (white) represents a case wherein the grain size of a catalyst was set to 4.5 mm, the reaction temperature was set to 180° C. and the gas hourly space velocity was set to 3750 h$^{-1}$, ♦ (white) represents a case wherein the grain size of a catalyst was set to 5 mm, the reaction temperature was set to 180° C. and the gas hourly space velocity was set to 3750 h$^{-1}$, O (black) represents a case wherein the grain size of a catalyst was set to 0.8 mm, the reaction temperature was set to 200° C. and the gas hourly space velocity was set to 7500 h$^{-1}$, Δ (black) represents a case wherein the grain size of a catalyst was set to 1 mm, the reaction temperature was set to 200° C. and the gas hourly space velocity was set to 7500 h$^{-1}$, square (black) represents a case wherein the grain size of a catalyst was set to 4.5 mm, the reaction temperature was set to 200° C. and the gas hourly space velocity was set to 7500 h$^{-1}$, and O (black) represents a case wherein the grain size of a catalyst was set to 5 mm, the reaction temperature was set to 200° C. and the gas hourly space velocity was set to 7500 h$^{-1}$.

From the results, it was confirmed that the HCN conversion rate was no less than 98% when the reaction temperature was 180° C. and the gas hourly space velocity was 3750 h$^{-1}$, and no less than 95% when the reaction temperature was 200° C. and the gas hourly space velocity was 7500 h$^{-1}$. It was thus confirmed that the subject catalyst had high activity even with regard to the HCN conversion.

It was also confirmed that the HCN conversion rate was approximately constant regardless of the grain size of the catalyst and the treatment time if the reaction temperature and the gas hourly space velocity were unchanged and it was thus confirmed that the degree of progress of the HCN conversion depended on the reaction temperature and the gas hourly space velocity, but did not depend on the grain size of the catalyst, and that the activity of the catalyst was not lowered even if the treatment time increased.

From the foregoing experiments, it was found out that when contacting a mixed gas containing COS and HCN with an alkalized chromium oxide-aluminum oxide catalyst in the presence of steam, wherein the mixed gas and the steam were at a volume ratio of 0.05≦steam/mixed gas≦0.3, at a gas hourly space velocity no less than 2000 h$^{-1}$ at a temperature in the range of 150° C. through 250° C. so as to convert COS and HCN, the alkalized chromium oxide-aluminum oxide catalyst should be set to have a grain size in the range of 1 mm through 4.5 mm for achieving the high COS conversion rate no less than 98% and the high HCN conversion rate no less than 95%.

The reason why the reaction temperature is set to 150° C. through 250° C. in the present invention is that the activity of the catalyst becomes too large if it is set to higher than 250° C. so that the duration of the catalyst may be shortened, and that the consumption of energy increases if it is set to a higher temperature so that the foregoing temperature range has been used hitherto in view of the energy consumption. Further, the reason why the volume ratio between the steam and the mixed gas is set to 0.05≦steam/mixed gas≦0.3 is that the steam amount has been hitherto set to a value no less than a stoichiometric value for the converting reactions of COS and HCN and no greater than a dew point composition for suppressing changing of alumina into boehmite.

As described above, according to the foregoing preferred embodiment of the present invention, since the grain size of the alkalized chromium oxide-aluminum oxide catalyst is optimized when applying the converting treatment to the mixed gas containing COS and HCN, the high conversion rates of COS and HCN can be achieved even at the gas hourly space velocity no less than 2000 h$^{-1}$. Since COS and HCN can be converted at the high processing speed, the catalyst bed can be reduced in size even when performing the mass-treating on an industrial scale, thereby resulting in reduction in size and cost of the whole apparatus.

Further, since the grain size of the alkalized chromium oxidealuminum oxide catalyst is optimized, the progress of the side reaction is suppressed so that the 98% COS conversion rate and the 95% HCN conversion rate can be achieved even during the long-time treatment such as for 8000 hours.

The mixed gas to be covered by the present invention may also be a gas containing only COS or a gas containing only HCN. Further, the process of the present invention may also be applied to a treatment for removing only COS from the mixed gas or a treatment for removing only HCN from the mixed gas.

INDUSTRIAL APPLICABILITY

As described above, since the grain size of the alkalized chromium oxide-aluminum oxide catalyst is set to no less than 1 mm and no greater than 4.5 mm when implementing the conversion treatment for COS and/or HCN by contacting the mixed gas containing COS and/or HCN with the alkalized chromium oxide-aluminum oxide catalyst in the presence of the steam, the conversion treatment can be carried out at the high processing speed such as no less than 2000 $h^{-1}$ of gas hourly space velocity so that the high conversion rate of COS and/or HCN can be achieved.

What is claimed is:

1. A process for converting carbonyl sulfide and hydrogen cyanide contained in a mixed gas by contacting the mixed gas containing said carbonyl sulfide and hydrogen cyanide with an alkalized chromium oxide-aluminum oxide catalyst in the presence of steam, wherein the mixed gas and the steam at a volume ratio of $0.05 \leq$ steam/mixed gas $\leq 0.3$ are contacted with said alkalized chromium oxide-aluminum oxide catalyst having a grain size in the range of no less than 1 mm and less than 4.5 mm at a gas hourly space velocity no less than 2000 $h^{-1}$ at a temperature in the range of 150° C. through 250° C. said grain size representing a diameter when said alkalized chromium oxide-aluminum oxide catalyst has a spherical shape, while representing an equivalent diameter being a length 6 times a ratio between a geometrical volume and a geometrical surface area when said alkalized chromium oxide-aluminum oxide catalyst has a shape other than a spherical shape.

2. The process according to claim 1, wherein the alkalized chromium oxide-aluminum oxide catalyst contains 1 to 40 weight % of chromium oxide and 0.1 to 15 weight % of basic alkali metal compound calculated as oxide.

3. The process according to claim 2, wherein the basic alkali metal compound is potassium carbonate.

4. A process for converting carbonyl sulfide and hydrogen cyanide contained in a mixed gas by contacting the mixed gas containing said carbonyl sulfide and hydrogen cyanide with an alkalized chromium oxide-aluminum oxide catalyst in the presence of steam, wherein the mixed gas and the steam at a volume ratio of $0.05 \leq$ steam/mixed gas/$\leq 0.3$ are contacted with said alkalized chromium oxide-aluminum oxide catalyst having a grain size in the range of 1 mm through 3 mm at a gas hourly space velocity no less than 2000 $h^{-1}$ at a temperature in the range of 150° C. through 250° C., said grain size representing a diameter when said alkalized chromium oxide-aluminum oxide catalyst has a spherical shape, while representing an equivalent diameter being a length 6 times a ratio between a geometrical volume and a geometrical surface area when said alkalized chromium oxide-aluminum oxide catalyst has a shape other than a spherical shape.

5. The process according to claim 4, wherein the gas hourly space velocity is no less than 3500 $h^{-1}$.

* * * * *